(12) United States Patent
Mathoy (10) Patent No.: US 9,083,218 B2
(45) Date of Patent: Jul. 14, 2015

(54) PERMANENT MAGNET EXCITED SYNCHRONOUS MACHINE WITH EMBEDDED MAGNETS

(75) Inventors: Arno Mathoy, Grabs (CH); Verena Mathoy, legal representative, Grabs (CH); Anna Mathoy, legal representative, Grabs (CH); Eva Mathoy, legal representative, Grabs (CH)

(73) Assignee: BRUSA Elektronik AG, Sennwald (CH)

( * ) Notice: Subject to any disclaimer, the term of this patent is extended or adjusted under 35 U.S.C. 154(b) by 428 days.

(21) Appl. No.: 13/390,632

(22) PCT Filed: Jul. 23, 2010

(86) PCT No.: PCT/IB2010/053366
§ 371 (c)(1),
(2), (4) Date: Mar. 28, 2012

(87) PCT Pub. No.: WO2011/033397
PCT Pub. Date: Mar. 24, 2011

(65) Prior Publication Data
US 2012/0175989 A1 Jul. 12, 2012

Related U.S. Application Data

(60) Provisional application No. 61/246,123, filed on Sep. 26, 2009.

(30) Foreign Application Priority Data

Sep. 18, 2009 (CH) .................................. 1445/09

(51) Int. Cl.
*H02K 21/12* (2006.01)
*H02K 1/27* (2006.01)

(52) U.S. Cl.
CPC .................................. *H02K 1/2766* (2013.01)

(58) Field of Classification Search
CPC ..................................................... H02K 1/2766
USPC .......................... 310/156.53, 156.56, 156.57
See application file for complete search history.

(56) References Cited

U.S. PATENT DOCUMENTS 3,126,493 A   3/1964  Honsiger
3,652,885 A   3/1972  Honsiger (Continued)

FOREIGN PATENT DOCUMENTS

CN      201197104 Y    2/2009
DE      102006021489 A1  11/2007

(Continued)

OTHER PUBLICATIONS

"Antriebsentwicklung (Drive development)" at www.brusa.biz, report discussed in paragraph [0015] of Applicant's specification; version 2nd Quarter 2008.

(Continued)

*Primary Examiner* — Hanh Nguyen
(74) *Attorney, Agent, or Firm* — George Kapsalas; Patentbuero Paul Rosenich AG (57) ABSTRACT

A permanent magnet excited synchronous machine (1) with embedded magnets, which is particularly suitable for range extender generator. It includes stator (2) and rotor (3) being provided with exciter magnets (7). The rotor (3) has at least two rotor poles (4), each is provided with one exciter magnet (7). In order to increase the magnetic torque limit of the synchronous machine (1)—in each rotor pole (4) at least one, preferably several selective magnetic flux barriers, preferably as substantially radial slots (8) being parallel with the main pole flux is/are provided in the area of the pole shoe.

21 Claims, 3 Drawing Sheets

(56) References Cited

U.S. PATENT DOCUMENTS

| | | | |
|---|---|---|---|
| 4,063,123 | A | 12/1977 | Herr et al. |
| 4,118,648 | A | 10/1978 | Gillet et al. |
| 5,369,325 | A * | 11/1994 | Nagate et al. ............ 310/156.54 |
| 5,378,953 | A | 1/1995 | Uchida et al. |
| 5,666,016 | A | 9/1997 | Cooper |
| 5,747,909 | A | 5/1998 | Syverson et al. |
| 5,818,139 | A | 10/1998 | Yamagiwa et al. |
| 5,818,140 | A | 10/1998 | Vagoti |
| 6,121,706 | A | 9/2000 | Nashiki et al. |
| 6,147,428 | A | 11/2000 | Takezawa et al. |
| 6,147,429 | A | 11/2000 | Akemakou et al. |
| 6,163,097 | A | 12/2000 | Smith et al. |
| 6,239,526 | B1 | 5/2001 | Oh et al. |
| 6,259,181 | B1 | 7/2001 | Kawano et al. |
| 6,271,613 | B1 | 8/2001 | Akemakou et al. |
| 6,300,703 | B1 | 10/2001 | Kawano et al. |
| 6,359,366 | B1 | 3/2002 | Liang et al. |
| 6,472,789 | B1 | 10/2002 | Akemakou |
| 6,509,667 | B1 | 1/2003 | El-Antably et al. |
| 6,548,931 | B2 | 4/2003 | Liang et al. |
| 6,703,745 | B2 | 3/2004 | Chu |
| 6,727,629 | B1 | 4/2004 | Soghomonian et al. |
| 6,756,870 | B2 | 6/2004 | Kuwahara |
| 6,769,167 | B2 | 8/2004 | Lee et al. |
| 6,847,143 | B1 | 1/2005 | Akemakou |
| 7,141,905 | B2 | 11/2006 | Vollmer |
| 7,233,090 | B2 * | 6/2007 | Evans et al. ............. 310/156.57 |
| 7,358,638 | B2 | 4/2008 | Miyashita et al. |
| 7,358,698 | B2 | 4/2008 | Seguchi et al. |
| 7,504,754 | B2 | 3/2009 | Jahns et al. |
| 7,560,835 | B2 | 7/2009 | Groenig et al. |
| 7,628,581 | B2 | 12/2009 | DeSimone et al. |
| 7,701,104 | B2 | 4/2010 | Akemakou |
| 7,732,965 | B2 | 6/2010 | Nakayama et al. |
| 7,847,461 | B2 | 12/2010 | Rahman et al. |
| 7,932,658 | B2 | 4/2011 | Ionel |
| 8,198,776 | B2 | 6/2012 | Mathoy |
| 2003/0048024 | A1 | 3/2003 | Chu |
| 2005/0168089 | A1 | 8/2005 | Miyashita et al. |
| 2006/0103254 | A1 | 5/2006 | Horst |
| 2006/0119203 | A1 | 6/2006 | Brown et al. |
| 2006/0119206 | A1 | 6/2006 | Akemakou |
| 2006/0290316 | A1 | 12/2006 | Seguchi et al. |
| 2007/0096578 | A1 | 5/2007 | Jahns et al. |
| 2007/0120429 | A1 | 5/2007 | Howard et al. |
| 2007/0228862 | A1 | 10/2007 | Welchko et al. |
| 2008/0247515 | A1 | 10/2008 | Probst et al. |
| 2008/0272667 | A1 | 11/2008 | Ionel et al. |
| 2009/0009114 | A1 | 1/2009 | Schunk et al. |
| 2009/0045765 | A1 * | 2/2009 | Ichiyama ..................... 318/538 |
| 2009/0127949 | A1 | 5/2009 | Zhang et al. |
| 2009/0134734 | A1 | 5/2009 | Nashiki |
| 2009/0140592 | A1 | 6/2009 | Rahman et al. |
| 2010/0308686 | A1 | 12/2010 | Mathoy |
| 2012/0274168 | A1 | 11/2012 | Holzner et al. |

FOREIGN PATENT DOCUMENTS

| | | |
|---|---|---|
| DE | 102007037901 A1 | 2/2009 |
| EP | 1569320 A2 | 8/2005 |
| EP | 2061132 A1 | 5/2009 |
| GB | 2378323 A | 2/2003 |
| JP | S59-011759 A | 1/1984 |
| JP | 2003-158838 A | 5/2003 |
| JP | 2008-245406 A | 10/2008 |
| WO | 2006/095887 A1 | 9/2006 |
| WO | 2007/048211 A2 | 5/2007 |
| WO | 2007/091692 A1 | 8/2007 |
| WO | 2007/104617 A1 | 9/2007 |
| WO | 2007/107420 A1 | 9/2007 |
| WO | 2008/113082 A1 | 9/2008 |
| WO | 2009/027290 A1 | 3/2009 |
| WO | 2009/027938 A2 | 3/2009 |
| WO | 2007/048211 A3 | 4/2009 |
| WO | 2009/063350 A2 | 5/2009 |
| WO | 2011/033397 A3 | 7/2011 |

OTHER PUBLICATIONS

Delaere K. et al., "Influence of Rotor Slot Wedges on Stator Currents and Stator Vibration Spectrum of Induction Machines: A Transient Finite Element Analysis," published 2002, from (www.esat.kuleuven.ac.be/elen).

Kirtley Jr., J.I., "Designing Squirrel Cage Rotor Slots With High Conductivity", published in ICEM 2004 (International Conference on Electrical Machines, Kracow, Poland).

"International Search Report (ISR) dated Jan. 11, 2010 from priority Swiss national application CH1445/2009."

International Search Report and International Preliminary Report on Patentability, dated May 17, 2011, from parent International Application PCT/IB10/053366. (in English).

"Isfahani, A. and Sadeghi, S., ""Design of a Permanent Magnet Synchronous Machine for the Hybrid Electric Vehicle,"" in World Academy of Science, Engineering and Technology 45, 2008, pp. 566-570."

Brusa Elektronik AG website at Internet address: http://www.bruza.biz, dated Feb. 10, 2010.

* cited by examiner

PERMANENT MAGNET EXCITED SYNCHRONOUS MACHINE WITH EMBEDDED MAGNETS

This application is a 35 U.S.C. 371 national-phase entry of PCT International application no. PCT/IB2010/050333 filed on Jan. 26, 2010 and also claims benefit of foreign priority to Swiss national application no. CH-1445/2009 filed on Sep. 18, 2009, and also claims priority as a non-provisional of U.S. provisional application Ser. No. 61/246,123 filed on Sep. 26, 2009, and both Swiss national application no. CH-1445/2009 and U.S. provisional application Ser. No. 61/246,123 are incorporated herein by reference in their entireties for all intents and purposes, as if set forth in full identically herein.

FIELD OF THE INVENTION

This invention relates to a permanent magnet excited synchronous machine with embedded magnets, in particular to a permanent magnet synchronous machine for synchronous generators of internal combustion engines, preferably for a range extension of electrical vehicles.

STATE OF ART

The permanent magnet excited synchronous machines are widely used as power generators in a power range of 3 to 30 kW. Such machines comprise a stator and a rotor. Most synchronous machines are designed to have an internal rotor; in this arrangement the rotor is the inner part and the stator the outer one. When external rotor is used, then the arrangement is reversed. The stator is provided with permanent magnets or electro-magnets. In permanent magnet excited synchronous machines, the rotor is also referred to as "anchor".

The designs, in which the magnets are placed inside the rotor, identify themselves as particularly easy to produce. This arrangement is commonly referred to as an embodiment with embedded magnets or "Internal Permanent Magnet" (IPM).

The assembly of the magnets inside the rotor has, in addition to the mechanical advantages, a series of electromagnetic characteristics, among others, the reluctance of the motor is highlighted as the most significant, that is, the dependence of inductance of the motor from the rotor position to the phase angle of the stator current.

While the reluctance at vehicle drives is a very welcome opportunity to influence the field through the current phase angle, it has an adverse effect on the magnetic moment limit and hence on the available torque for starting the internal combustion engine provided with generator for extension of the travel range of the electric vehicles (Range Extender Generator).

The electrical power generated by the range extender generator and/or mechanical power covers the average power consumption of a vehicle up to a certain maximum sustained speed. But, power peaks, e.g. for accelerations, hill climbing and top speed, etc. the vehicle require additional power from the drive system, which is contributed by the significantly more powerful electric motor of the main drive.

The internal combustion engine may be operated exclusively as a stationary working engine, even if its performance should be modulated via the speed of rotation, which is in favor of its efficiency and emission behavior optimized in a narrow speed and power ranges.

Compared with aggregates of vehicle drives, a motor for a range extender needs a very little space for built-in. It usually consists of only one or two cylinders therefore there is a very big difference between the medium output torque, as well as the positive top output torque produced during the power stroke and the negative top output torque occurring during the compression stroke.

In the starting process, the torque peaks at each starting position are to be overcome and the motor is to be accelerated to a nominal speed of rotation, so that the cold-start phases in their difficult manageable emissions performance can be kept short, without any negative impact on the effective total emissions of the vehicle during the relevant cycle.

For this reason, a good overload capability and, at the same time, a high efficiency in the nominal working range are required from the coupled permanent magnet excited synchronous motor as generator, so as not to detract the critical efficiency of serial hybrid driving systems.

For the start-up phase, the generator should be able to work as a motor. After overcoming the starting driving torque from a standing start, the generator is operated as a motor for a few seconds to provide a huge overload moment in order to keep short the emission-critical start-up phase of the combustion engine working at minimum speed of rotation. Then the nominal torque of the generator is significantly exceeded, which requires—over an appropriately sized inverter—a very high magnetic torque limit from the generator.

Due to the above special requirements on permanent magnet excited synchronous machine as generator, the use of certain types of permanent magnet synchronous machines (PSM) has proved particularly advantageous in the prior art. For technological reasons, a preferred type of PSM also uses the structure of the rotor as a retaining system for the magnets.

The use of a sinusoidal field machines (sine wave generator) as permanent magnet excited synchronous machines has the advantage of a constant torque on the angle of rotation and of less noise from the harmonic fields compared to rectangular field generators. This is also valid when it is used as generator in the intermediate circuit of battery, with a constant power output over an angle of rotation.

The power development of internal combustion engines being heavy with harmonic, especially those with a low number of cylinders, affects positively the behavior of a sine wave generator as a constant torque absorber. The strong oscillations in the torque of the internal combustion engine cause different rotation speed changes through the changes of inertia moment of the rotor.

A problem with generators of the prior art lies in that the torque of the generator react to the internal combustion engine. On the other hand, eddy-currents can pass in the magnet according to the prior art, which cause different speed changes and additional losses.

The rotor of a sine wave generator also works as a flywheel. Such flywheel masses are already known, and they transform the torque shocks of the internal combustion engine into a waviness of rotation speed. By this dual function of the generator, the waviness of the mechanical power on the current site is small. Has not the generator of this behavior, additional torque harmonics can be generated in the generator, leading to rotary oscillations, which may cause, in addition to a sound exposure, through compensatory processes, additional losses in the mechanical and electrical system.

In the prior art, the permanent magnet excited synchronous machines with surface magnets usable as a generator have no or only very minor induction difference between the main axis, which passes through the pole, and the secondary or transverse axis, which passes through the pole-gap. Their reluctance behavior can be neglected, so they would be suitable for the requirements of the range extender generator, if the magnets would be adequate sized. The assembly of the magnets, however, has been carried out in a fitting process with adhesive bond and subsequent bandaging with Kevlar or fiberglass, so that it is a complex manufacturing process, which needs an extended cycle times during the production.

Furthermore, the location of the magnets on the surface causes that iterating electric fields penetrate in the magnets and generate eddy-currents in the conductive material of the magnets, which are connected with losses, and which may cause self-heating and de-magnetization of the magnets.

In the embedded arrangement of the magnets inside the rotor, the production difficulties of motors with surface magnets can be largely eliminated, however, partly significant differences in the inductances of the main and the secondary axis are caused. Consequently, the resulting reluctance effects reduce the overload capacity of the generator.

An attempt was made to minimize this effect by a thin soft magnetic structure that surrounds the magnet. But, this construction has mechanical and electro-magnetic limits. In the very thin version of the retention structure, similar eddy-current losses occur in the magnetic materials as in the surface magnets.

The document WO2007/048211A2 discloses a rotor with exciter permanent magnets, in which three air barriers are provided in the pole shoe area of each rotor pole. These air barriers are designed as long almond-like openings being oriented parallel with the pole main axis. By these air barriers an attempt was made to reduce the dispersion of the magnetic flux of the permanent magnets, but its result was not satisfactory.

SUMMARY

The main object of the present invention is therefore the provision of a permanent magnet excited synchronous machine with embedded magnets, which has a similar overload capacity as the synchronous machines with surface magnets, but without any additional losses in the magnets, and which avoids the above mentioned disadvantages of the prior art.

It is a further object of the present invention to keep the advantages of permanent magnet excited synchronous machine with surface magnets, and to combine its high overload capacity with the advantages of the embedded magnets, especially as to their advantageous manufacture-ability.

This above task has been solved by versions of the synchronous machine according to the present description. Further advantageous versions are also specified herein.

In order to increase a magnetic torque limit of the synchronous machine, and at the same time to reduce a cross-flux in the rotor pole—each of the openings is formed as selective flux barrier, preferably in form of an essentially radial slot having a constant width.

So according to the present invention, in each rotor pole at least one, but usually some selective magnetic flux barriers is/are provided, in such a way, that they do not represent any additional resistances against the main flux of the magnet, but they do represent considerable resistances against the harmful cross-flux. Thereby the reluctance torque has been effectively reduced.

By means of these selective flux barriers according to the invention, the magnetic resistance in the direction of the transversal Q-axis increases significantly and thereby the effect of the stator (mainly in Q-direction) in terms of the cross-flux is largely suppressed. So the behavior of this machine under high load is very similar to that of a surface magnet machine.

It is to be noted that the constant width of this selective flux barriers plays an important role since by their mutual directions they form a quasi "flux channels" which "project" or guide the homogeneous magnetic flux in a sinusoidal distribution onto the rotor surface. Thereby the main role of the flux barriers has been completely achieved in the practice due to the present invention, especially due to special, non-parallel arrangement of the flux barriers, which was earlier for others only a task to be solved, but without any success.

So we have succeeded in improving the previously already mentioned air barriers (known from WO2007/048211A1 according to the present invention so much, that this improvement is connected with surprising technical effects which are mentioned in the present disclosure.

By applying the selective magnet flux barrier in the form of substantially radial slots having constant width in the soft magnetic part of the rotor pole, formed above the exciter permanent magnet, the magnetic torque limit is greatly increased. This increase in the magnetic torque limit is of the greatest advantage, especially in embodiments as generators for REX-generators.

In the invention, compared to conventional permanent magnet excited machines with embedded magnets, the reluctance torque is significantly reduced in REX-generators, especially in start and uphill phases of the vehicle, when the combustion engine must be brought very quickly to its operating speed of rotation. Advantageously, thereby e.g. the cold-start phase can be as short as possible, but a post-treatment of the exhaust gases may be as simple as possible, which are also important advantages.

If the REX-generator does not meet these features, then the high raw emissions cannot be avoided (that is why considerable additional measures are needed in the prior art). Alternatively, the REX-generator could be equipped with additional surface magnets, thereby a uniform division concept for the main drive will be difficult or impossible, and it would cause the above mentioned disadvantages.

It is to be noted that such a uniform division concept was previously not possible with a traditional permanent magnet machine with embedded magnets—without the reluctance barriers according to the present invention—, because the available magnetic torque limit for the simultaneous fulfillment of all tasks, placed on the REX-generator, was not sufficient.

The permanent magnet excited synchronous machine according to the invention is easy to produce, wherein the rotor plates are punched with the slot-shaped recesses in the pole shoe area. Smaller bridges or webs may remain available as connecting bridges to allow the rotor to the required strength properties.

According to a preferred embodiment of the present invention, these mechanically non-crossable connecting bridges or webs are occupied or saturated by additional, relatively small permanent magnets, so that they themselves also act as additional flux barriers, although they are made of soft iron.

Preferably, in at least one of the slots, at least one permanent magnet, as additional flux barrier, may be arranged. The required magnet volume is substantially less than 10% of the magnetic mass for the main field.

Preferably pre-magnetized permanent magnets are simply pushed into the prepared "pockets" of the magnet flux barriers, that is, in the substantially radial slots with constant width (slotted sections of the pole shoe). Without this measure the flux barriers would act only after the saturation of the connecting bridges with the unwanted cross-flux, which would cause a smaller reduction of the reluctance. Surprisingly, the reluctance can be much more reduced with the inserted additional permanent magnets.

Considering conventional internal permanent magnet excited synchronous motors (IPM), the invention provides a new permanent magnet excited synchronous machine, in particular for Range Extender Generators (REX-generator) with the following advantageous properties:

The pole surface is designed so that the magnet induced flux has a sinusoidal distribution.

On the other hand, the one or more magnetic flux barrier/s in the soft magnetic area of the magnet is/are arranged along the main axis or D-axis of the rotor pole, which strongly reduces the inductance of the transverse axis (Q), but the flux of the main axis (D) is not hindered by any additional resistance. So its initial value can be maintained, without any limits, thereby the undesirable reluctance is reduced, and the magnetic torque has been increased to a range of an equivalent machine having surface mounted magnets.

BRIEF DESCRIPTION OF DRAWINGS

Such and further details and advantages of the invention will be described using an exemplary embodiment of the invention, a permanent magnet excited synchronous machine with embedded magnets, referring to the attached drawings, in which.

The same reference characters designate the same or similar components throughout the drawings.

DETAILED DESCRIPTION

Figure 1:
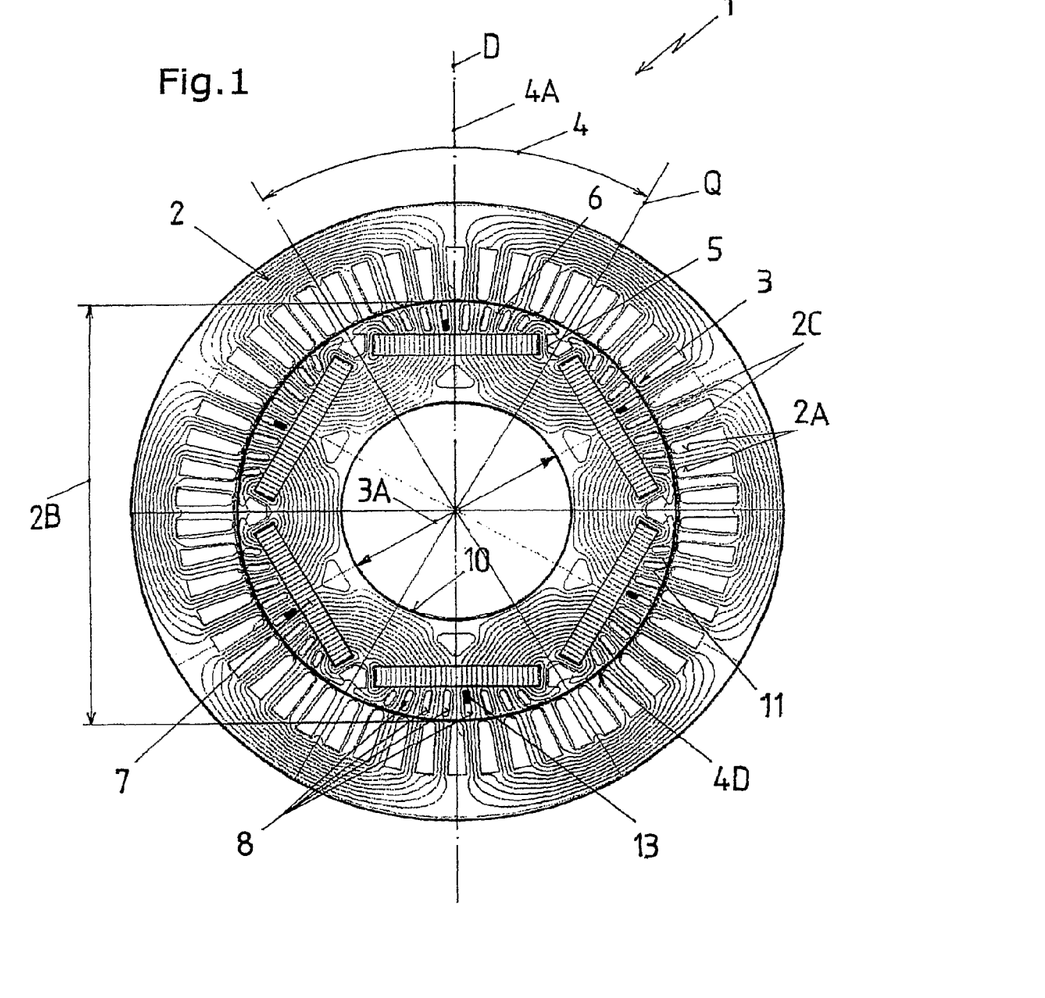
FIG. 1 is a cross-section of the permanent-magnet excited synchronous machine according to the invention, with magnetic flux lines.

FIG. 1 depicts a schematic cross section of an embodiment of a permanent magnet excited synchronous machine 1, with magnetic flux lines, according to the invention. The illustrated embodiment is specially optimized for Range Extender Generators.

The synchronous machine 1 is equipped with an outer stator 2 and an inner rotor 3. The stator 2 is provided in a conventional manner with grooves 2A for known distributed windings (not illustrated). A diameter of an inner bore 11 of the stator 2 is designated with 2B in FIG. 1. This bore 11 of the stator 2 is designed for receiving the rotor 3. Between said grooves 2A stator teeth 2C are provided in the stator 2. The rotor 3 has an inner bore 10 with a diameter 3A for receiving a shaft.

Figure 3:
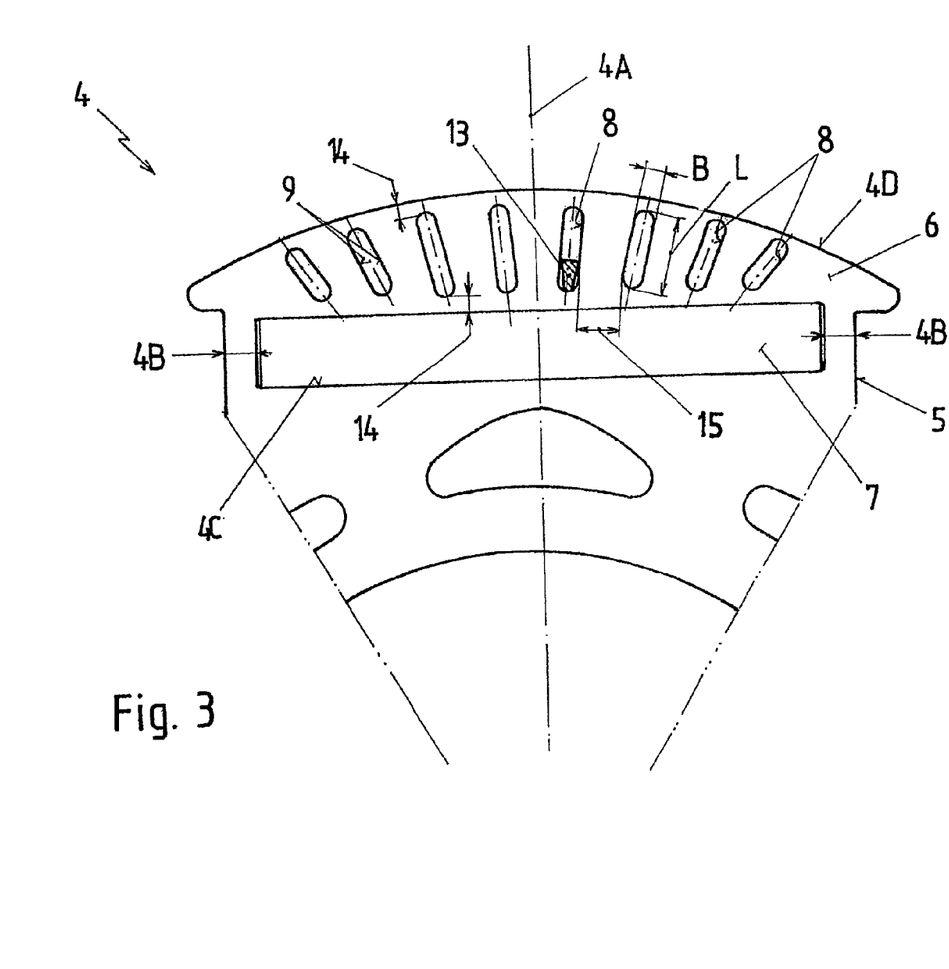

In the illustrated embodiment, the rotor 3 has a 6-pole design. In the sense of the invention, the rotor 3 may also have a 2-pole, 4-pole, 8-pole, etc. design. In FIG. 1, the rotor 3 is illustrated with salient rotor poles 4, wherein pole cores and pole shoes are designated with 5 and 6, respectively. A main central pole axis D is designated with 4A, too (FIGS. 1 and 3). In FIG. 1, a secondary or transverse axis Q is also illustrated, which passes through a gap between the poles 4.

Each of the rotor poles 4 is associated with an exciter permanent magnet 7, which is horizontally placed in the pole core 5 (FIGS. 2 and 3) and is limited on both sides by two retarding bridges 4B. The exciter permanent magnet 7, is arranged in a long rectangular magnet cavity 4C of the rotor pole 4. An external surface of the rotor 4 is designated in the drawings by 4D.

Figure 2:
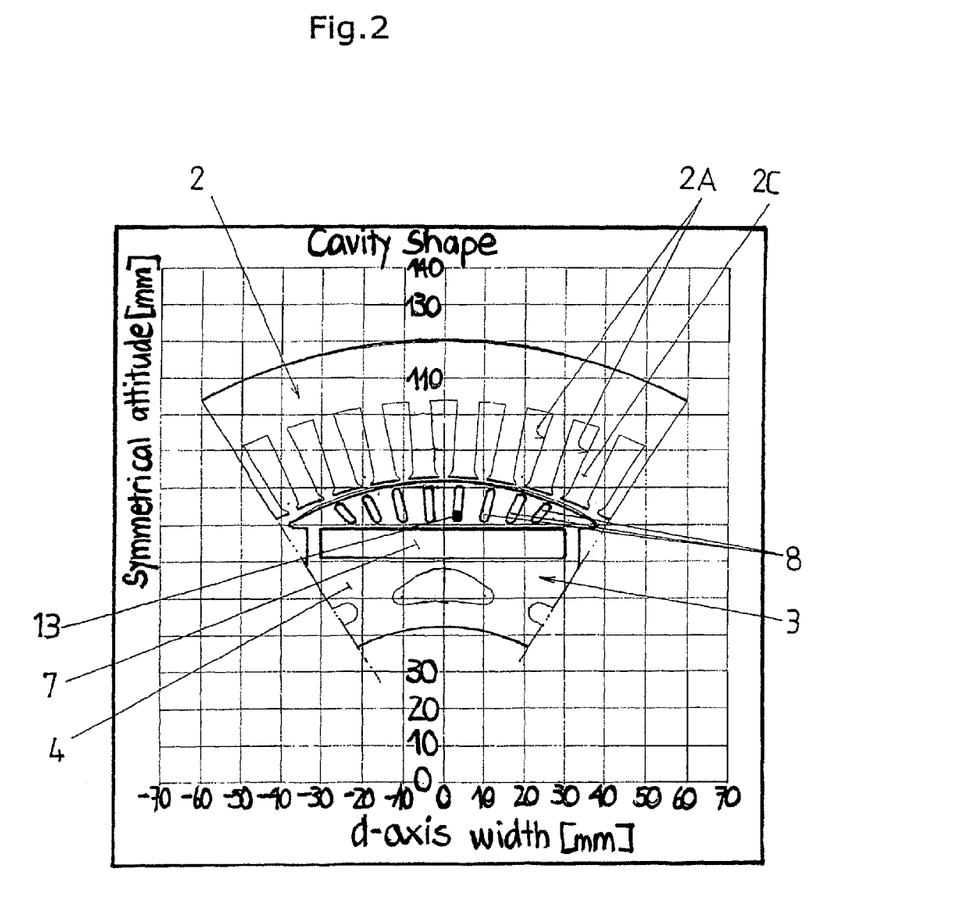
FIG. 2 shows a diagrammatic view of an embodiment variant of a part of the synchronous machine of FIG. 1, as a result of our experiments; and, FIG. 3 illustrates an enlarged top view of a rotor pole according to FIG. 2.

FIG. 2 shows a diagrammatic view of the embodiment variant of the synchronous machine 1 according to the invention illustrated in FIG. 1, as a result of our experiments. According to the invention, the pole shoe 6 is provided with basically new rotor-geometry. The remaining elements of the rotor 3 are substantially the same as in the conventional machines with embedded magnets.

In the sense of the invention, in order to increase a magnetic torque limit of the synchronous machine 1, and on the other hand, to reduce a cross-flux in the rotor pole 4, in each rotor pole 4 is at least one, preferably more, selective magnetic flux barrier, preferably in the form of a longitudinal slot 8 is provided in a direction of the magnetic flux of a main axis 4A of the rotor pole 4. It means, with other words, that these slots 8 practically have a substantially radial orientation in the pole shoe 6, with a constant width B. So the slots 8, acting as selective flux barriers, are formed in the pole shoes 6 as approximately radial longitudinal openings with substantially parallel side surfaces 9. As shown in FIG. 3, the slots 8 are in a fan arrangement over a rotor circle chord segment parallel to a longitudinal axis of the rectangular magnet cavity 4C.

According to a further feature of the invention, the orientation of the slots 8, acting as selective flux barriers, is chosen in such a way that the remaining soft metal parts in the pole shoe 6 have about the same number as the stator teeth 2C (FIG. 1) in the relevant section of the pole shoe 6.

With regard to the dimensions and orientation of the slots 8 and the rotor poles 4 in this embodiment, it is shown in FIGS. 2 and 3, that the relatively narrow, substantially radial slots 8 have a length L and said width B. The length L of the slot 8 is limited by both a surface of the permanent magnet 7 and the external surface 4D of the rotor pole 4, minus metal bridges or webs 14 required for the sufficient mechanical strength of the rotor 3. Considering FIGS. 1-3, the width B of the slots 8 is not greater than extent so as to make a first ratio of a respective minimum distance 15 between adjacent respective ones of said plurality of slots 8, to width of the respective slots 8, $ratio_1=$(min. distance 15/B); to be greater than or equal to, a second ratio of stator tooth 2C width to width of stator grooves 2A between adjacent stator teeth, $ratio_2=$(width stator tooth 2C/width stator gap 2A); i.e., $ratio_1 \geq ratio_2$. The depicted relation of the length L to width B as shown in the drawing is about an optimum. However, different relations are within the scope of invention.

In a particularly effective embodiment of the permanent-magnet excited synchronous machine 1 according to the invention, as illustrated in FIGS. 2 and 3, at least one relatively small additional permanent magnet 13, as additional flux barrier, (e.g. a total of 0.1 kg magnet/50 kW nominal power) is arranged preferably in the radial inner portion of at least one the slots 8. It may, but does not necessarily fill the entire slot 8 (see FIG. 3).

If the magnet 13 would fill the slot 8 completely, then the effect of flux barrier would be most probably reduced, and on the other hand, the rotor 3 would be heavier. In the external section of the pole shoe 6 the magnet 13 would be exposed to special heating and/or de-magnetization. But, this embodiment may also be taken into consideration in special applications.

In a further embodiment, the north-south pole position of the permanent magnet 13, as additional flux barrier, can be arranged transversely to the slot 8. Furthermore, the permanent magnet 13, as additional flux barrier, is preferably wedge-shaped or trapezoidal and tapered toward the inner bore 10 of the rotor 3 as indicated in FIG. 3.

Two or more slots 8 are provided in each pole shoe 6, and the number of the slots 8, as selective flux barriers, can be determined in such a manner to correspond to the number of the stator teeth 2C in the area of the corresponding pole shoe 6.

Preferably, the already pre-magnetized permanent magnet 13, which itself also represents an additional flow barrier, is designed such that its generated flux lines should be capable to saturate the magnetically conductive webs 14, that limit the flux barriers and mechanically they are designed properly. The pre-saturated webs 14 have then a high resistance against each magnetic flux.

In operation, the permanent magnets 13 therefore behave against the effective flux as an extension of the slots 8, because the anyway disturbing magnetic conductivity of the webs 14 is completely eliminated or blocked by the inserted permanent magnets 13, in this application.

These webs 14 in the rotor are mechanically also advantageous to absorb the centrifugal forces and pressure forces of the shaft-fit between the shaft and the rotor 3. They are to be designed precisely according to strength considerations and adapted to the current application.

The intentional saturation of the mechanically necessary interruption of the flux-barrier in the direction of the transverse axis Q (FIG. 2) in the permanent magnet excited salient pole machine 1, with embedded permanent magnets, by means of the additional permanent magnets 13, which have been introduced exclusively for this purpose to act as additional flux barriers, thus represents a fundamental improvement of the present invention.

This substantial improvement can be used universally in electric drive systems, that is, it is worth using independent of the application described above. In this regard, we stress that the invention is not restricted to internal permanent magnet excited machines. Wherever plate bridges are necessary for strength reasons, but from the magnetic aspects flux barriers are advantageous, then such magnets can be used to eliminate the magnetic conductivity at the metal bridges.

With the above flux barriers according to the present invention increase the magnetic torque limit in the permanent magnet excited salient pole machine 1 significantly, because the resulting q-inductance will be reduced by a factor of 1.5-2.0, compared to the embodiments having no flux barriers. This has been so far the reason why internal permanent magnet machines have been considered less torque capable compared to machines with surface mounted magnets. Which on the other hand have other disadvantages.

Due to the proposed selective reluctance barriers, that is, the radial slots 8 and the inserted magnets 13, in our test machine (having 123 mm active length and 165 mm rotor diameter) with 90 Nm nominal torques we realized a maximum torque of 360 Nm, that is, four times so much as the nominal torque. Without the proposed selective reluctance barriers, a similar motor according to the prior art could produce only about 250 Nm, regardless of the capabilities of the inverter, which would be too few for a starter-generator of a correspondingly large-sized Diesel-engine for a safe cold-start under extreme working conditions.

In the permanent magnet excited synchronous machine 1 according to FIG. 1-3, the relationship between the inductance of the main axis D and the inductance of the transverse axis Q (FIG. 1) has been reduced at a level of a conventional surface magnet machine, thereby surprisingly its magnetic torque limit has been reached, but without any disadvantages of the known surface magnet machines.

By introduction of the magnets 13 into the slots 8, as additional flux barriers, being parallel to the pole flux lines, the above effect can be further increased, because then also the mechanically necessary limiting bridges or webs 14 can be saturated, consequently, they do also act really as flux barriers.

Of course, the invention is not limited to the described embodiment. Many further embodiments and combinations thereof are also possible within the claimed scope of protection on the basis of the above disclosure.

LIST OF REFERENCE LABELS

1—Permanent magnet excited synchronous machine with buried magnets
2—Stator
2A—Groove (for winding)
2B—Inner bore diameter of stator
2C—Tooth of stator
3—Rotor
3A—Diameter of internal bore of rotor
4—Rotor pole
4A—Pole axis
4B—Retarding bridge
4C—Cavity for receiving magnet
4D—External pole surface
5—Pole core
6—Pole shoe
7—Exciter permanent magnet
8—Slot as selective flux barrier
9—Side surface
10—Inner bore of rotor
11—Inner bore of stator
13—Permanent magnet as additional flux barrier
14—Web
15—Distance between slots
B—Width of slot
L—Length of slot
D—Main axis
Q—Transversal axis

What is claimed is:

1. A permanent magnet excited synchronous machine comprising:
a stator, said stator having a plurality of circumferential stator teeth;
a rotor configured to rotate in said stator;
a rotary shaft supporting said rotor for rotation on its axis;
a salient pole on said rotor, said salient pole including a shank, said salient pole including a shoe on said shank;
a rectangular cross-section cavity in said salient pole, said rectangular cavity having a cross-section major axis coincident with a chord of a circle delimited by the rotor diameter, said rectangular cavity having a radially-outer top wall parallel to said chord and said major axis;
an exciter permanent magnet in said rectangular cavity;
a plurality of selective flux barrier slots in said salient pole, said plurality of slots disposed radially outwardly of said permanent magnet and between said radially-outer top wall of said rectangular cavity and an external surface of said shoe;
said plurality of slots disposed in a fan arrangement relative to said chord so that slots of said plurality that are located circumferentially nearer to a main axis of said pole are inclined at a lesser absolute value of inclination angle relative to the main pole axis than are others of said slots relatively located circumferentially farther from the main pole axis; and, said plurality of slots is a number selected to correspond to the number of said stator teeth radially opposite to said shoe.

2. A permanent magnet excited synchronous machine as claimed in claim 1, further comprising:
a flux barrier permanent magnet in one of said plurality of slots.

3. The permanent magnet excited synchronous machine as claimed in claim 2, wherein:
said flux barrier permanent magnet is wedge-shaped in longitudinal cross-section and tapered in a radial direction toward said rotary shaft.

4. The permanent magnet excited synchronous machine as claimed in claim 2, wherein:
said flux barrier permanent magnet fills no more than a radially-inner third of said one of said plurality of slots.

5. The permanent magnet excited synchronous machine as claimed in claim 2, wherein:
the north-south pole orientation of said flux barrier permanent magnet is disposed transversely to said slot.

6. A permanent magnet excited synchronous machine as claimed in claim 2, further comprising:
a plurality of flux barrier permanent magnets, each respective one of said plurality of flux barrier permanent magnets disposed in a respective one of said plurality of slots.

7. The permanent magnet excited synchronous machine as claimed in claim 1, wherein:
each of said slots has a constant width over its respective length.

8. The permanent magnet excited synchronous machine as claimed in claim 7, wherein:
a first ratio, of a minimum distance between adjacent ones of said plurality of slots to width of said slots, is at least identical or greater than a second ratio, of stator tooth width to width of stator gap between adjacent ones of said plurality of stator teeth.

9. A permanent magnet excited synchronous machine comprising:
a stator, said stator having a plurality of circumferential stator teeth;
a rotor configured to rotate in said stator;
a rotary shaft supporting said rotor for rotation on its axis;
a salient pole on said rotor, said salient pole including a shank, said salient pole including a shoe on said shank;
a rectangular cross-section cavity in said salient pole, said rectangular cavity having a cross-section major axis coincident with a chord of a circle delimited by the rotor diameter, said rectangular cavity having a radially-outer top wall parallel to said chord and said major axis;
an exciter permanent magnet in said rectangular cavity;
a plurality of selective flux barrier slots in said salient pole, said plurality of slots disposed radially outwardly of said permanent magnet and between said radially-outer top wall of said rectangular cavity and an external surface of said shoe;
a plurality of flux barrier permanent magnets, each respective one of said plurality of flux barrier permanent magnets disposed in a respective one of said plurality of slots;
said flux barrier permanent magnets being wedge-shaped in their respective longitudinal cross-sections and tapered in a radial direction toward said rotary shaft; and,
said plurality of slots is a number selected to correspond to the number of said stator teeth radially opposite to said shoe.

10. The permanent magnet excited synchronous machine as claimed in claim 9, wherein:
said plurality of flux barrier permanent magnets each fills no more than a radially-inner third of the respective slot in which it is disposed.

11. The permanent magnet excited synchronous machine as claimed in claim 9, wherein:
the north-south pole orientation of each of said flux barrier permanent magnets is disposed transversely to the respective slot in which it is disposed.

12. The permanent magnet excited synchronous machine as claimed in claim 9, wherein:
each of said slots has a constant width over its respective length.

13. The permanent magnet excited synchronous machine as claimed in claim 9, wherein:
a first ratio, of a minimum distance between adjacent ones of said plurality of slots to width of said slots, is at least identical or greater than a second ratio, of stator tooth width to width of stator gap between adjacent ones of said plurality of stator teeth.

14. The permanent magnet excited synchronous machine as claimed in claim 9, wherein:
said plurality of slots are disposed in a fan arrangement relative to said chord so that slots of said plurality that are located circumferentially nearer to a main axis of said pole are inclined at a lesser absolute value of inclination angle relative to the main pole axis than are others of said slots relatively located circumferentially farther from the main pole axis.

15. A permanent magnet excited synchronous machine comprising:
a stator;
a rotor configured to rotate in said stator;
at least two rotor poles on said rotor;
a respective exciter magnet disposed in each respective one of said at least two rotor poles;
each of said at least two rotor poles respectively having a respective plurality of openings formed as selective flux barriers configured to increase magnetic torque limit and reduce rotor pole cross-flux, said selective flux barriers each being in the form of a respective radially extending slot having a constant width over substantially its entire length;
said stator having a plurality of circumferential stator teeth; and,
said plurality of slots is a number selected to correspond to the number of said stator teeth radially opposite to said shoe.

16. A permanent magnet excited synchronous machine comprising:
a stator;
a rotor configured to rotate in said stator;
at least two rotor poles on said rotor;
a respective exciter magnet disposed in each respective one of said at least two rotor poles;
each of said at least two rotor poles respectively having a respective plurality of openings formed as selective flux barriers configured to increase magnetic torque limit and reduce rotor pole cross-flux, said selective flux barriers each being in the form of a respective radially extending slot having a constant width over substantially its entire length;
said stator having a plurality of circumferential stator teeth; and,
a first ratio, of minimum distance between adjacent ones of said plurality of slots to width of said slots, is greater than or equal to a second ratio, of stator tooth width to width of a stator gap between adjacent ones of said plurality of stator teeth.

17. A permanent magnet excited synchronous machine comprising:
   a stator;
   a rotor configured to rotate in said stator;
   at least two rotor poles on said rotor;
   a respective exciter magnet disposed in each respective one of said at least two rotor poles;
   each of said at least two rotor poles respectively having a respective plurality of openings formed as selective flux barriers configured to increase magnetic torque limit and reduce rotor pole cross-flux, said selective flux barriers each being in the form of a respective radially extending slot having a constant width over substantially its entire length; and,
   a flux barrier permanent magnet in at least one of said plurality of slots.

18. The permanent magnet excited synchronous machine as claimed in claim 17, wherein:
   said flux barrier permanent magnet is wedge-shaped in longitudinal cross-section and tapered in a radial direction toward said rotary shaft.

19. The permanent magnet excited synchronous machine as claimed in claim 17, wherein:
   said flux barrier permanent magnet fills no more than a radially-inner third of said at least one of said plurality of slots.

20. The permanent magnet excited synchronous machine as claimed in claim 17, wherein:
   a north-south pole position of said flux barrier permanent magnet in said at least one of said plurality of slots is arranged transversely to a length of said at least one of said plurality of slots.

21. A permanent magnet excited synchronous machine as claimed in claim 17, further comprising:
   each respective one of said slots being formed as a respective longitudinal opening having respective parallel side surfaces; and,
   said at least two rotor poles are salient poles.

* * * * *